United States Patent
Lee et al.

(10) Patent No.: US 11,923,149 B2
(45) Date of Patent: *Mar. 5, 2024

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Jong Ho Lee, Suwon-si (KR); Yong Park, Suwon-si (KR); Ki Pyo Hong, Suwon-si (KR); Sim Chung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,735

(22) Filed: Jan. 31, 2023

(65) Prior Publication Data
US 2023/0170150 A1  Jun. 1, 2023

Related U.S. Application Data

(63) Continuation of application No. 16/831,254, filed on Mar. 26, 2020, now Pat. No. 11,610,739.

(30) Foreign Application Priority Data

Jun. 21, 2019 (KR) .................. 10-2019-0073887

(51) Int. Cl.
*H01G 4/30* (2006.01)
*H01G 2/02* (2006.01)
(Continued)

(52) U.S. Cl.
CPC .................. *H01G 4/30* (2013.01); *H01G 2/02* (2013.01); *H01G 4/008* (2013.01); *H01G 4/012* (2013.01); *H01G 4/1218* (2013.01)

(58) Field of Classification Search
CPC ...... H01G 4/008; H01G 4/012; H01G 4/1218; H01G 4/30
See application file for complete search history.

(56) References Cited

U.S. PATENT DOCUMENTS 8,947,851 B2    2/2015  Koizumi
10,522,293 B2   12/2019 Sakate et al.
(Continued)

FOREIGN PATENT DOCUMENTS

CN    102751092 A    10/2012
CN    103227049 A    7/2013
(Continued)

OTHER PUBLICATIONS

Office Action issued in corresponding Japanese Patent Application No. 2020-067885 dated Mar. 1, 2022, with English translation.
(Continued)

*Primary Examiner* — Nathan Milakovich
(74) *Attorney, Agent, or Firm* — MORGAN, LEWIS & BOCKIUS LLP

(57) ABSTRACT

A multilayer ceramic capacitor includes a ceramic body including dielectric layers, a plurality of internal electrodes disposed in the ceramic body, and a first side margin portion and a second side margin portion respectively arranged on end portions of the internal electrodes exposed to first and second surfaces. The first and second side margin portions each include a first region adjacent to an outward facing side surface of the respective side margin portion, and a second region adjacent to the internal electrodes exposed to the first and second surfaces of the ceramic body, and an average size
(Continued)

of dielectric grains included in the second region is larger than an average size of dielectric grains included in the first region.

8 Claims, 10 Drawing Sheets

(51) Int. Cl.
*H01G 4/008* (2006.01)
*H01G 4/012* (2006.01)
*H01G 4/12* (2006.01)

(56) References Cited

U.S. PATENT DOCUMENTS

| | | | |
|---|---|---|---|
| 10,636,569 B2 | 4/2020 | Kwon | |
| 10,679,790 B2 | 6/2020 | Park | |
| 10,916,377 B2 | 2/2021 | Park | |
| 11,170,936 B2 * | 11/2021 | Park | H01G 4/1227 |
| 11,342,117 B2 | 5/2022 | Park | |
| 11,348,730 B2 | 5/2022 | Park | |
| 11,587,732 B2 * | 2/2023 | Park | H01G 4/30 |
| 11,610,739 B2 * | 3/2023 | Lee | H01G 4/012 |
| 2012/0262840 A1 | 10/2012 | Koizumi | |
| 2013/0194715 A1 | 8/2013 | Kim et al. | |
| 2014/0376152 A1 | 12/2014 | Koizumi | |
| 2015/0340155 A1 | 11/2015 | Fukunaga et al. | |
| 2016/0196918 A1 | 7/2016 | Hong et al. | |
| 2017/0243697 A1 | 8/2017 | Mizuno et al. | |
| 2018/0061575 A1 | 3/2018 | Mizuno | |
| 2018/0182555 A1 | 6/2018 | Kowase | |
| 2018/0261390 A1 | 9/2018 | Sakate et al. | |
| 2019/0035554 A1 | 1/2019 | Inomata et al. | |
| 2019/0131074 A1 | 5/2019 | Mizuno | |
| 2020/0066446 A1 | 2/2020 | Fukunaga et al. | |
| 2020/0105471 A1 * | 4/2020 | Kwon | H01G 4/30 |
| 2020/0194176 A1 | 6/2020 | Park | |
| 2021/0005382 A1 | 1/2021 | Park et al. | |
| 2021/0210286 A1 | 7/2021 | Kwon et al. | |
| 2022/0028612 A1 | 1/2022 | Park | |
| 2022/0148811 A1 * | 5/2022 | Kwon | H01G 4/12 |

FOREIGN PATENT DOCUMENTS

| | | | |
|---|---|---|---|
| CN | 107799306 A | 3/2018 | |
| CN | 108573811 A | 9/2018 | |
| CN | 109326442 A | 2/2019 | |
| JP | 2012-227260 A | 11/2012 | |
| JP | 2016-1721 A | 1/2016 | |
| JP | 2017-011172 A | 1/2017 | |
| JP | 2017-147358 A | 8/2017 | |
| JP | 2017-147429 A | 8/2017 | |
| JP | 2018-107239 A | 7/2018 | |
| JP | 2018-142728 A | 9/2018 | |
| JP | 2018-148118 A | 9/2018 | |
| JP | 2019-079977 A | 5/2019 | |
| JP | 2020-035788 A | 3/2020 | |
| KR | 10-2010-0136917 A | 12/2010 | |
| KR | 10-2012-0118405 A | 10/2012 | |
| KR | 10-2016-0084614 A | 7/2016 | |
| KR | 10-2018-0102998 A | 9/2018 | |
| KR | 10-2019-0116119 A | 5/2022 | |

OTHER PUBLICATIONS

Office Action issued in corresponding Japanese Patent Application No. 2020-067885 dated Jul. 13, 2021, with English translation.
Office Action issued in corresponding Chinese Patent Application No. 202010517722.X dated Aug. 18, 2021, with English translation.
Notice of Allowance issued in corresponding U.S. Appl. No. 16/831,254 dated Oct. 28, 2022.
Office Action issued in corresponding U.S. Appl. No. 16/831,254 dated Jul. 27, 2022.
Office Action issued in corresponding Korean Patent Application No. 10-2019-0073887 dated Jan. 4, 2024, English abstract.

* cited by examiner

MULTILAYER CERAMIC CAPACITOR AND METHOD OF MANUFACTURING THE SAME

CROSS-REFERENCE TO RELATED APPLICATION

This application is the continuation application of U.S. patent application Ser. No. 16/831,254 filed on Mar. 26, 202, which claims benefit of priority to Korean Patent Application No. 10-2019-0073887 filed on Jun. 21, 2019 in the Korean Intellectual Property Office, the disclosures of which are incorporated herein by reference in their entirety.

BACKGROUND

The present disclosure relates to a multilayer ceramic capacitor capable of improving reliability, and a method of manufacturing the same.

In general, an electronic component using a ceramic material such as a capacitor, an inductor, a piezoelectric element, a varistor, a thermistor, or the like, may include a ceramic body made of a ceramic material, an internal electrode formed in the body, and an external electrode provided on an surface of the ceramic body to be connected to the internal electrode.

In recent years, miniaturization and multifunctionality of electronic products have led to the tendency for miniaturization and high functionality in chip components. Therefore, a multilayer ceramic capacitor may be required to be a small-sized, high-capacitance product.

In order to make the multilayer ceramic capacitor small in size and high in capacitance, it may be required to maximize an effective area of the electrode (increase the effective volume fraction providing capacitance).

As above, in order to realize a small-sized, high-capacitance multilayer ceramic capacitor, in manufacturing the multilayer ceramic capacitor as described above, there may be applied a method in which the internal electrodes are exposed in the width direction of the body to maximize an area of the internal electrodes in the width direction through a design without a margin, and, after preparing the chip, a side margin portion may be separately attached to the exposed surface of the electrode in the width direction of the chip in a pre-sintering operation.

However, in the case of the above method, in the operation of forming the side margin portion, a large amount of pores may be generated at the interface in which the ceramic body and the side margin portion are in contact with each other, and the large amount of pores may deteriorate reliability.

In addition, due to the pores, deterioration in reliability for moisture resistance may be caused by a decrease in sintering compactness of the outer portion.

Therefore, there is a need for research that may prevent deterioration in reliability for moisture resistance in ultra-small and high-capacitance products.

SUMMARY

An aspect of the present disclosure is to provide a multilayer ceramic capacitor capable of improving reliability, and a method of manufacturing the same.

According to an aspect of the present disclosure, a multilayer ceramic capacitor includes a ceramic body including dielectric layers, and including a first surface and a second surface opposing each other, a third surface and a fourth surface connecting the first and second surfaces and opposing each other, and a fifth surface and a sixth surface connected to the first, second, third, and fourth surfaces and opposing each other. A plurality of internal electrodes are disposed in the ceramic body, are each exposed to the first and second surfaces, and are each exposed to only one of the third surface or the fourth surface. A first side margin portion and a second side margin portion are respectively arranged on end portions of the internal electrodes exposed to the first and second surfaces. The first and second side margin portions each include a first region adjacent to an outward facing side surface of the respective side margin portion, and a second region adjacent to the internal electrodes exposed to the first and second surfaces of the ceramic body. An average size of dielectric grains included in the second region is larger than an average size of dielectric grains included in the first region.

According to another aspect of the present disclosure, a method of manufacturing a multilayer ceramic capacitor, includes preparing a plurality of first ceramic green sheets each having a plurality of first internal electrode patterns formed at predetermined intervals, and a plurality of second ceramic green sheets each having a plurality of second internal electrode patterns formed at predetermined intervals. A ceramic green sheet stacked body is formed by alternately stacking the first ceramic green sheets and the second ceramic green sheets to alternately arrange the first internal electrode patterns and the second internal electrode patterns in a thickness direction. The ceramic green sheet stacked body is cut to have the first internal electrode patterns and the second internal electrode patterns exposed to side surfaces in a width direction. A first side margin portion and a second side margin portion are formed on the side surfaces having the exposed first internal electrode patterns and second internal electrode patterns, to provide a cut stacked body, and the cut stacked body is sintered to provide a ceramic body comprising dielectric layers and first and second internal electrodes. The first and second side margin portions each include a first region adjacent to an outward facing surface of the respective side margin portion, and a second region adjacent to the side surfaces in the width direction having the exposed internal electrodes. An average size of dielectric grains included in the second region is larger than an average size of dielectric grains included in the first region.

According to another aspect of the present disclosure, a multilayer ceramic capacitor includes a ceramic body including first internal electrodes and second internal electrodes alternately stacked with each other and having dielectric layers disposed therebetween, and first and second side margin portions respectively disposed on opposing first and second side surfaces of the ceramic body. The first and second internal electrodes extend to each of the first and second side surfaces of the ceramic body. The first and second side margin portions each include a second region facing and extending along the respective first or second side surface of the ceramic body, and a second region facing away from the ceramic body, and the first region of each of the first and second side margin portions has a content of magnesium (Mg) different from a content of magnesium (Mg) of the second region of each of the first and second side margin portions.

According to a further aspect of the present disclosure, a multilayer ceramic capacitor includes a ceramic body including first internal electrodes and second internal electrodes alternately stacked with each other and having dielectric layers disposed therebetween, and first and second side margin portions respectively disposed on opposing first and second side surfaces of the ceramic body. The ceramic body includes an active portion comprising the alternatively stacked first and second internal with the dielectric layers disposed, and upper and lower cover portions including dielectric and formed above an uppermost internal electrode and below a lowermost internal electrode in the ceramic body, and the upper and lower cover portions each include a second region facing and extending along the respective uppermost or lowermost internal electrode of the active portion, and a second region facing away from the active portion. An average size of dielectric grains in the first region of each of the upper and lower cover portions is different from an average size of dielectric grains in the second region of each of the upper and lower cover portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
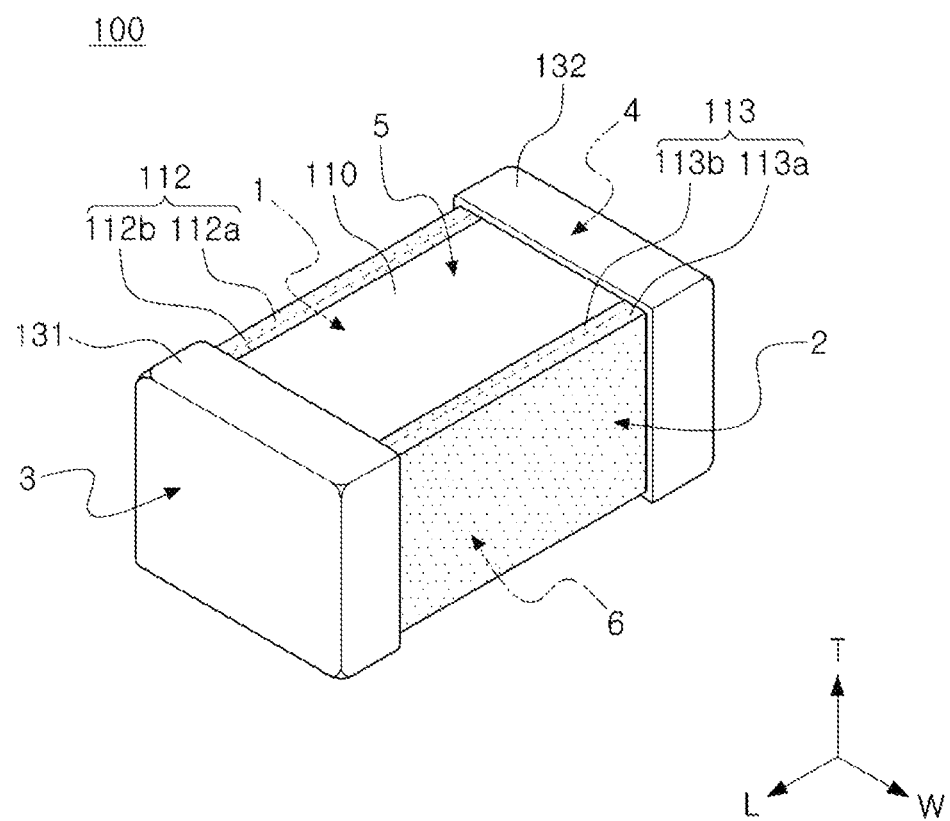
FIG. 1 is a schematic perspective view illustrating a multilayer ceramic capacitor according to an embodiment of the present disclosure.

Hereinafter, preferred embodiments of the present disclosure will be described with reference to the accompanying drawings. Embodiments of the present disclosure may be modified into various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

FIG. 1 is a schematic perspective view illustrating a multilayer ceramic capacitor according to an embodiment of the present disclosure.

Figure 2:
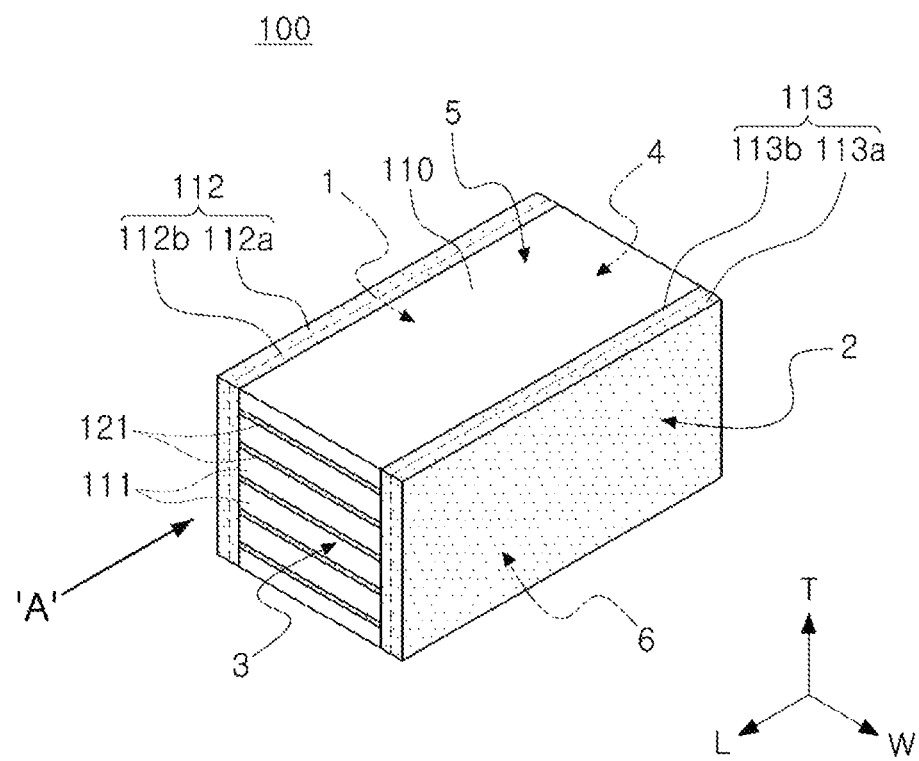
FIG. 2 is a perspective view illustrating the ceramic body and side margin portions of FIG. 1.

FIG. 2 is a perspective view illustrating an appearance of the ceramic body of FIG. 1.

Figure 3:
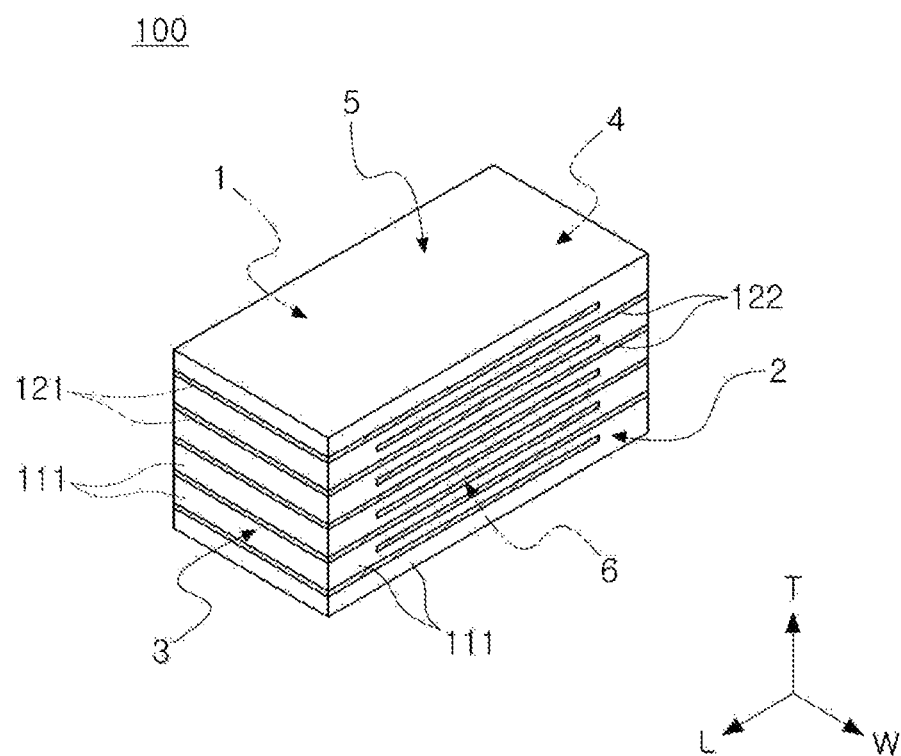
FIG. 3 is a perspective view illustrating a ceramic green sheet stacked body of the ceramic body of FIG. 2, prior to a sintering operation.

FIG. 3 is a perspective view illustrating a ceramic green sheet stacked body of the ceramic body of FIG. 2, prior to a sintering operation.

Figure 4:
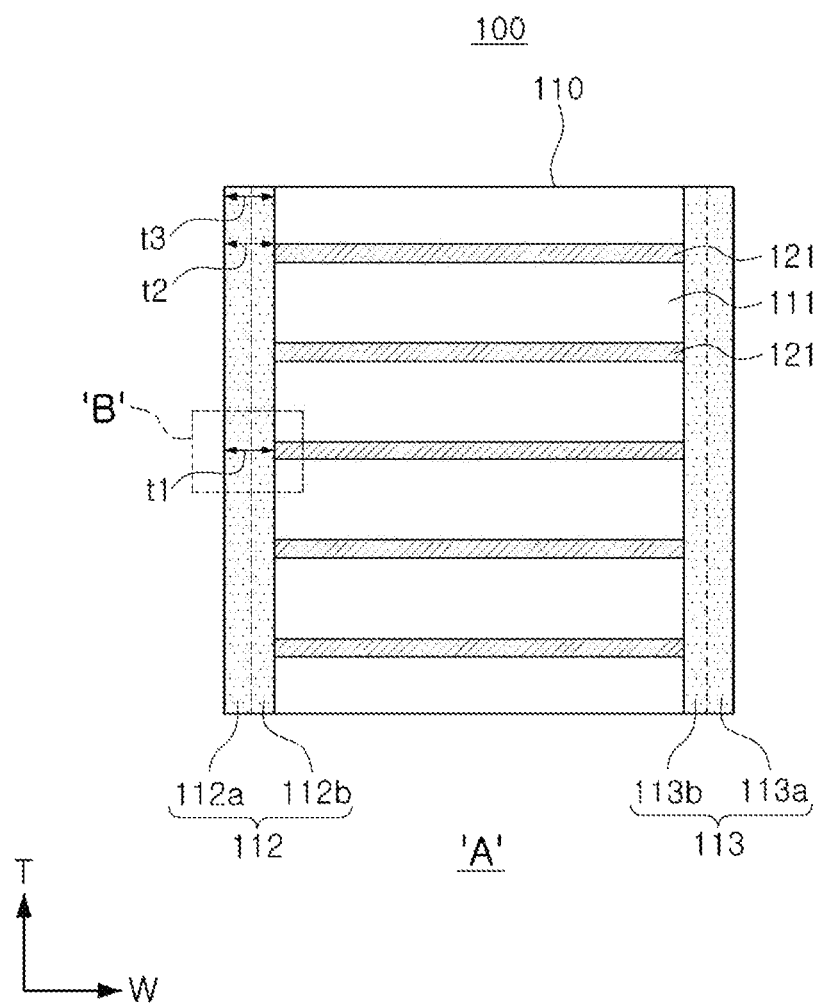
FIG. 4 is a side view of FIG. 2, when viewed in direction A.

FIG. 4 is a side view of FIG. 2, when viewed in direction A.

Referring to FIGS. 1 to 4, a multilayer ceramic capacitor 100 according to this embodiment may include a ceramic body 110, a plurality of internal electrodes 121 and 122 disposed in the ceramic body 110, and external electrodes 131 and 132 disposed on one or more external surface(s) of the ceramic body 110.

The ceramic body 110 may have a first surface 1 and a second surface 2 opposing each other, a third surface 3 and a fourth surface 4 connecting the first surface and the second surface and opposing each other, and a fifth surface 5 and a sixth surface 6 which may correspond to an upper surface and a lower surface of the ceramic body 110.

The first surface 1 and the second surface 2 may be defined as surfaces opposing each other in a width direction of the ceramic body 110, the third surface 3 and the fourth surface 4 may be defined as surfaces opposing each other in a longitudinal or length direction, and the fifth surface 5 and the sixth surface 6 may be defined as surfaces opposing each other in a thickness direction.

A shape of the ceramic body 110 is not particularly limited, but may be a rectangular parallelepiped shape as illustrated in the drawings.

The plurality of internal electrodes 121 and 122 disposed in the ceramic body 110 may each have one end exposed to a respective one of the third surface 3 and the fourth surface 4 of the ceramic body.

The internal electrodes 121 and 122 may include a first internal electrode 121 and a second internal electrode 122 having different polarities and disposed in pairs.

One end of each of the first internal electrode(s) 121 may be exposed to the third surface 3, and one end of each of the second internal electrode(s) 122 may be exposed to the fourth surface 4.

The other ends of the first internal electrode(s) 121 and the second internal electrode (s) 122 may be formed to be spaced apart respectively from the fourth surface 4 and the third surface 3 at regular intervals.

A first external electrode 131 may be formed on the third surface 3 of the ceramic body to be electrically connected to the first internal electrode(s) 121. A second external electrode 132 may be formed on the fourth surface 4 of the ceramic body to be electrically connected to the second internal electrode(s) 122.

A multilayer ceramic capacitor 100 according to an embodiment of the present disclosure may include a plurality of internal electrodes 121 and 122 disposed in the ceramic body 110, exposed to the first and second surfaces 1 and 2, and each having one end exposed to a respective one of the fourth surface 4 and the third surface 3; and a first side margin portion 112 and a second side margin portion 113 respectively arranged on end portions of the internal electrodes 121 and 122 exposed to the first and second surfaces 1 and 2.

The plurality of internal electrodes 121 and 122 may be formed in the ceramic body 110. Ends of each of the plurality of internal electrodes 121 and 122 may be exposed to the first and second surfaces 1 and 2, which are surfaces opposing each other in the width direction of the ceramic body 110, and the first side margin portion 112 and the second side margin portion 113 may be arranged on the exposed end portions, respectively.

An average thickness of each of the first side margin portion 112 and the second side margin portion 113 may be 2 μm or more and 15 μm or less.

According to an embodiment of the present disclosure, the ceramic body 110 may include a stacked body in which a plurality of dielectric layers 111 are stacked, and a first side margin portion 112 and a second side margin portion 113 respectively arranged on both side surfaces of the stacked body.

The plurality of dielectric layers 111 may be in a sintered state, and boundaries between neighboring dielectric layers may be unified to a degree not capable of being confirmed.

A length of the ceramic body 110 may correspond to a distance from the third surface 3 to the fourth surface 4 of the ceramic body.

A length of the dielectric layer 111 may form a space between the third surface 3 and the fourth surface 4 of the ceramic body.

According to an embodiment of the present disclosure, the length of the ceramic body may be 400 to 1400 μm. In particular, the length of the ceramic body may be 400 to 800 μm, or 600 to 1400 μm.

The internal electrodes 121 and 122 may be formed on the dielectric layers 111, and the internal electrodes 121 and 122 may be alternately stacked in the ceramic body 110 with a single dielectric layer interposed therebetween by a sintering process.

Referring to FIG. 3, the first internal electrode 121 may be formed on the dielectric layer 111. The first internal electrode 121 may not be formed or may not extend along an entirety of the longitudinal direction of the dielectric layer. For example, one end of the first internal electrode 121 may be formed at a predetermined interval from the fourth surface 4 of the ceramic body 110, and another end of the first internal electrode 121 (opposite to the one end) may be formed to extend up to the third surface 3 and to be exposed to the third surface 3.

End portions of the first internal electrode 121 exposed to the third surface 3 of the ceramic body may contact and be connected to the first external electrode 131.

In a different manner to the first internal electrode, one end of the second internal electrode 122 may be formed to be spaced apart by a predetermined interval from the third surface 3, and another end of the second internal electrode 122 (opposite to the one end) may extend to and be exposed to the fourth surface 4 and to contact and be connected to the second external electrode 132.

The internal electrodes 121 and 122 may be alternately stacked by 400 layers or more for implementation of a high-capacitance multilayer ceramic capacitor, but are not limited thereto.

The dielectric layers 111 may each have a width equal to a width of the first internal electrode 121. For example, the first internal electrode 121 may be formed to extend across an overall width direction of the dielectric layer 111.

According to an embodiment of the present disclosure, the width of the dielectric layers and the width of the internal electrodes may be 100 μm to 900 μm, but are not limited thereto. In particular, the width of the dielectric layers and the width of the internal electrodes may be 100 μm to 500 μm, or 100 μm to 900 μm.

As the ceramic body is miniaturized, the thickness of the side margin portion may affect the electrical characteristics of the multilayer ceramic capacitor. According to an embodiment of the present disclosure, the thickness of the side margin portion may be formed to be 15 μm or less, to improve the characteristics of the miniaturized multilayer ceramic capacitor.

For example, since the side margin portion may be formed to have a thickness of 15 μm or less, a high-capacitance and a small-sized multilayer ceramic capacitor may be realized by maximally ensuring overlapping region of the internal electrodes forming the capacitance.

The ceramic body 110 may include an active portion serving as a portion contributing to capacitance formation of the capacitor, and upper and lower cover portions respectively formed on upper and lower surfaces of the active portion, as upper and lower margin portions.

The active portion may be formed by repeatedly stacking the plurality of first and second internal electrodes 121 and 122 with the dielectric layer 111 interposed therebetween.

The upper and lower cover portions may have the same material and configuration as the dielectric layer 111, except that they do not include internal electrodes.

For example, the upper and lower cover portions may include a ceramic material, for example, a barium titanate ($BaTiO_3$)-based ceramic material, and may be respectively disposed above an uppermost internal electrode and below a lowermost internal electrode of the first and second internal electrodes 121 and 122.

Each of the upper and lower cover portions may have a thickness of 20 μm or less, but is not limited thereto.

In an embodiment of the present disclosure, the internal electrodes and the dielectric layers may be simultaneously cut off, and the widths of the internal electrodes and the widths of the dielectric layers may be formed to be the same. More specific details thereof will be described later.

The widths of the dielectric layers may be formed to be equal to the widths of the internal electrodes. Therefore, the ends of the internal electrodes 121 and 122 may be exposed from the first and second surfaces 1 and 2 of the ceramic body 110 in the width direction.

The first side margin portion 112 and the second side margin portion 113 may be respectively formed on both side surfaces of the ceramic body 110 from which the ends of the internal electrodes 121 and 122 are exposed.

The thickness of each of the first side margin portion 112 and the second side margin portion 113 may be 15 μm or less. The smaller the thickness of each of the first side margin portion 112 and the second side margin portion 113, the larger the overlapping region of the internal electrodes formed in the ceramic body 110 and the higher the resultant capacitance.

The thicknesses of the first side-margin portion 112 and the second side-margin portion 113 are not particularly limited as long as they have a thickness that may prevent short-circuiting of the internal electrode exposed from the side surface of the ceramic body 110. For example, the thickness of each of the first side margin portion 112 and the second side margin portion 113 may be 2 μm or more.

When the thickness of each of the first and second side margin portions is less than 2 μm, the mechanical strength against external impact may be lowered. When the thickness of each of the first and second side margin portions exceeds 15 μm, the overlapping region of the internal electrodes may be relatively reduced, and it may be difficult to secure a high-capacitance of the multilayer ceramic capacitor.

In order to maximize the capacitance of the multilayer ceramic capacitor, a method of thinning the dielectric layer, a method of stacking a thinned dielectric layer with a relatively high density, a method of improving coverage of internal electrodes, and the like, have been considered.

Further, a method of improving overlapping region of the internal electrodes forming capacitance has been considered.

In order to increase the overlapping region of the internal electrodes, a region of a margin portion in which the internal electrodes are not formed can be minimized.

Particularly, in order to increase the overlapping region of the internal electrodes, as the multilayer ceramic capacitor is miniaturized, the region of the margin portion should be minimized.

According to this embodiment, it may be characterized in that the internal electrode is formed on the entirety of the dielectric layer in the width direction, the thickness of the side margin portion is set to 15 μm or less, and the overlapping region of the internal electrodes is relatively large.

Generally, as the thickness of each of the dielectric layer and the internal electrode becomes thinner, the dielectric layers are stacked with a relatively high density. Therefore, a phenomenon that the internal electrodes are short-circuited may occur frequently. In addition, when the internal electrodes are formed only in a portion of the dielectric layer, a step difference due to the presence and absence of internal electrodes in different portions of the body may occur and deteriorate life span and reliability in the insulation resistance.

According to this embodiment, even when internal electrodes and a dielectric layer of a thin film are formed, since the internal electrodes may be entirely formed on the dielectric layer in the width direction, the overlapping region of the internal electrodes becomes large, and the capacitance of the multilayer ceramic capacitor may increase.

In addition, it is possible to provide a multilayer ceramic capacitor having improved reliability and excellent capacitance characteristics by reducing the step difference due to the internal electrode to improve the life span in insulation resistance.

Figure 5:
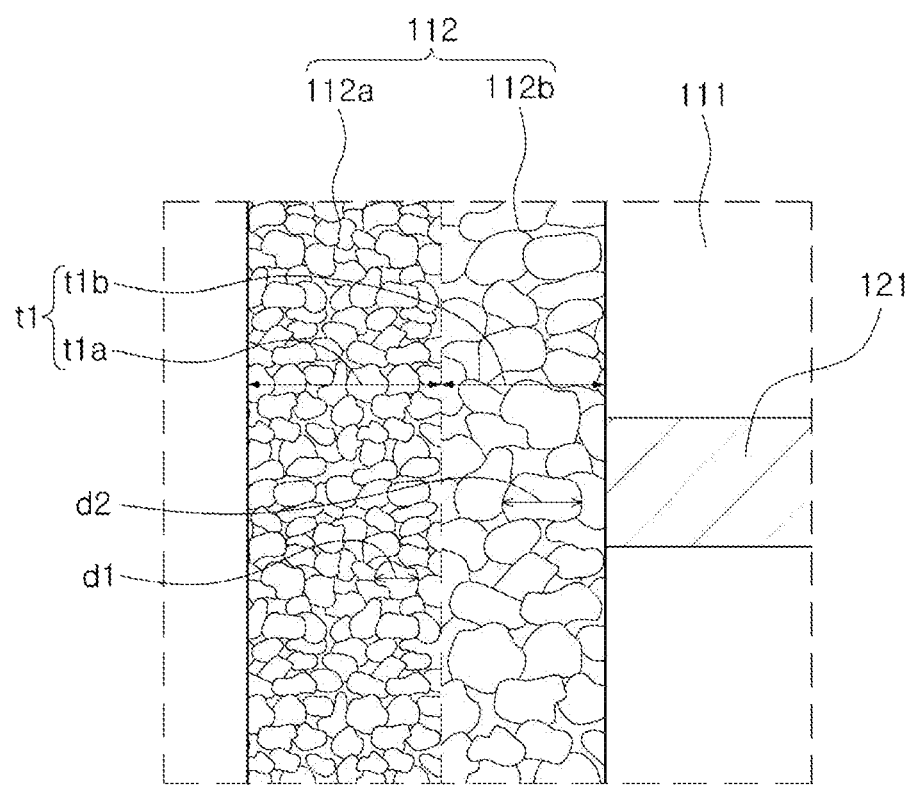
FIG. 5 is an enlarged view of region B of FIG. 4.

FIG. 5 is an enlarged view of region B of FIG. 4.

Referring to FIG. 5, the first and second side margin portions 112 and 113 may be respectively divided into first regions 112a and 113a adjacent to outer side surfaces of the side margin portions 112 and 113, and second regions 112b and 113b adjacent to the internal electrodes 121 and 122 exposed from the first and second surfaces 1 and 2 of the ceramic body 110. A size (d2) of a dielectric grain included in the second regions 112b and 113b may be larger than a size (d1) of a dielectric grain included in the first regions 112a and 113a.

Throughout this description, references to sizes of grains or particles in various regions may refer to average sizes of grains or particles. More generally, however, the references to sizes of grains or particles in various regions may refer to median sizes of the grains or particles in the various regions, to maximum sizes of the grains or particles, or to minimum sizes of the grains or particles.

The first and second side margin portions 112 and 113 arranged on the side surfaces 1 and 2 of the ceramic body 110 may each be divided into two regions having different sizes of dielectric grain. The size (d2) of the dielectric grain included in the second regions 112b and 113b may be adjusted to be larger than the size (d1) of the dielectric grain included in the first regions 112a and 113a, to improve the reliability for moisture resistance.

In particular, the size (d2) of the dielectric grain included in the second regions 112b and 113b of the side margin portions adjacent to the internal electrodes 121 and 122 exposed from the first surface 1 and the second surface 2 of the ceramic body 110, may be adjusted to be larger than the size (d1) of the dielectric grain included in the first regions 112a and 113a adjacent to the outer side surfaces of the first and second side margin portions 112 and 113, to reduce the number or density of pores existing in the second regions 112b and 113b of the side margin portions adjacent to the side margin portions 121 and 122, and to improve the reliability for moisture resistance.

The size (d1) of the dielectric grain included in the first regions 112a and 113a may be adjusted to be smaller than the size (d2) of the dielectric grain included in the second regions 112b and 113b, to form a high-toughness gap sheet, and to improve a mounting crack.

Generally, in an operation of forming the side margin portion, a large amount or number of pores may be generated at an interface in which the ceramic body and the side margin portions are in contact with each other, and may result in a deterioration in reliability.

Further, due to the pores generated at the interface in which the ceramic body and the side margin portions are in contact with each other, deterioration in reliability for moisture resistance may be caused by a decrease in sintering compactness of the outer portion.

According to an embodiment of the present disclosure, the size (d2) of the dielectric grain included in the second regions 112b and 113b of the side margin portions adjacent to the internal electrodes 121 and 122 exposed to the first surface 1 and the second surface 2 of the ceramic body 110, may be adjusted to be larger than the size (d1) of the dielectric grain included in the first regions 112a and 113a adjacent to the outer side surfaces of the first and second side margin portions 112 and 113, to reduce the number or density of pores existing in the second regions 112b and 113b of the side margin portions adjacent to the side margin portions 121 and 122, and to improve the reliability of moisture resistance.

A method of adjusting the size (d2) of the dielectric grain included in the second regions 112b and 113b of the side margin portions adjacent to the internal electrodes 121 and 122 exposed to the first surface 1 and the second surface 2 of the ceramic body 110 to be larger than the size (d1) of the dielectric grain included in the first regions 112a and 113a adjacent to the outer side surfaces of the first and second side margin portions 112 and 113, is not particularly limited. For example, the method may be realized by adjusting a size of a raw ceramic powder particle to be introduced in an operation of forming the first regions 112a and 113a and the second regions 112b and 113b.

For example, the method may be realized by adjusting a particle size of barium titanate ($BaTiO_3$) powder particle used as a raw material for forming the second regions 112b and 113b of the side margin portions adjacent to the internal electrodes 121 and 122 to be larger than a particle size of barium titanate ($BaTiO_3$) powder particle used as a raw material for forming the first regions 112a and 113a adjacent to the outer side surfaces of the first and second side margin portions 112 and 113.

Although not particularly limited, for example, the particle size of barium titanate ($BaTiO_3$) powder particles as a raw material for forming the second regions 112b and 113b of the side margin portions adjacent to the internal electrodes 121 and 122 may be about 70 nm, and the particle size of a barium titanate ($BaTiO_3$) powder particles as a raw material for forming the first regions 112a and 113a adjacent to the outer side surfaces of the first and second side margin portions 112 and 113 may be about 40 nm.

According to an embodiment of the present disclosure, a size of the raw ceramic powder particle to be introduced in the operations of forming the first regions 112a and 113a and the second regions 112b and 113b may be controlled. Therefore, after the sintering operation, the size (d1) of the dielectric grain included in the first regions 112a and 113a may be 90 nm or more and 410 nm or less, and the size (d2)

of the dielectric grain included in the second regions 112b and 113b may be 170 nm or more and 700 nm or less.

The size of each of the dielectric grains included in the first regions 112a and 113a and the second regions 112b and 113b may be obtained by measuring lengths in major axis and minor axis of the dielectric grains extracted from the respective regions to calculate an average size thereof.

When shapes of the dielectric grains are assumed to be an ellipse, the length in major axis of the dielectric grains may correspond to a particle size of the dielectric grains at points having the longest distance, among various points measured as a size of the dielectric grains, and the length in minor axis of the dielectric grains may correspond to a particle size of the dielectric grains at points having the shortest distance, among various points measured as a size of the dielectric grains.

Alternately, the feature of the present disclosure characterized in that the size (d2) of the dielectric grains included in the second regions 112b and 113b is adjusted to be larger than the size (d1) of the dielectric grains included in the first regions 112a and 113a can be confirmed by calculating maximum and minimum lengths of each of the dielectric grains extracted from each of the regions, and an average of the total dielectric grain size of each of the regions.

In the following Table 1, a length in a major axis, a length in a minor axis, and an average thereof for each of a plurality of grains is reported, along with a maximum value, a minimum value, and an average value of the dielectric grain sizes in each of the regions is reported. The reported lengths are provided separately for each of the regions, and may correspond to the size (d1) of the dielectric grains included in the first regions 112a and 113a (outer side) and the size (d2) of the dielectric grains included in the second regions 112b and 113b (inner side).

TABLE 1

| | Outer Side (nm) | | | Inner Side (nm) | | |
|---|---|---|---|---|---|---|
| | Major Axis | Minor Axis | Average Value | Major Axis | Minor Axis | Average Value |
| 1 | 201 | 187 | 194 | 511 | 489 | 500 |
| 2 | 145 | 111 | 128 | 655 | 412 | 533.5 |
| 3 | 385 | 253 | 319 | 522 | 308 | 415 |
| 4 | 469 | 290 | 379.5 | 437 | 258 | 347.5 |
| 5 | 199 | 121 | 160 | 469 | 283 | 376 |
| 6 | 175 | 126 | 150.5 | 411 | 398 | 404.5 |
| 7 | 363 | 184 | 273.5 | 237 | 207 | 222 |
| 8 | 380 | 211 | 295.5 | 187 | 164 | 175.5 |
| 9 | 279 | 131 | 205 | 778 | 612 | 695 |
| 10 | 311 | 237 | 274 | 599 | 516 | 557.5 |
| 11 | 104 | 87 | 95.5 | 342 | 276 | 309 |
| 12 | 268 | 246 | 257 | 547 | 402 | 474.5 |
| 13 | 396 | 211 | 303.5 | 490 | 451 | 470.5 |
| 14 | 274 | 132 | 203 | 351 | 333 | 342 |
| 15 | 266 | 155 | 210.5 | 467 | 441 | 454 |
| 16 | 193 | 148 | 170.5 | 595 | 488 | 541.5 |
| 17 | 135 | 92 | 113.5 | 535 | 319 | 427 |
| 18 | 180 | 169 | 174.5 | 463 | 291 | 377 |
| 19 | 288 | 236 | 262 | 574 | 326 | 450 |
| 20 | 482 | 319 | 400.5 | 437 | 207 | 322 |
| Max | | | 400.5 | | | 695 |
| Min | | | 95.5 | | | 175.5 |
| AVG | | | 228.475 | | | 419.7 |

According to an embodiment of the present disclosure, the first and second side margin portions 112 and 113 respectively disposed on the opposing side surfaces of the ceramic body 110 may be respectively divided into two regions having different compositions, and a content of magnesium (Mg) respectively included in the different regions of the first and second side marginal portions 112 and 113 may be made different, to improve the compactness of the first and second side margin portions 112 and 113, and improve the moisture resistance.

In particular, the content of magnesium (Mg) of the second regions 112b and 113b of the first and second side margin portions 112 and 113 may be greater than the content of magnesium (Mg) of the first regions 112a and 113a of the first and second side margin portions 112 and 113. Therefore, the compactness of the second regions 112b and 113b of the first and second side margin portions 112 and 113 may be enhanced to improve moisture resistance.

Particularly, the content of magnesium (Mg) of the first regions 112a and 113a of the first and second side margin portions 112 and 113, adjacent to the outer side surfaces of the first and second side margin portions 112 and 113, may be reduced to improve the defect of the mounting crack.

A method of adjusting the content of magnesium (Mg) included in the second regions 112b and 113b to be higher than the content of magnesium (Mg) included in the first regions 112a and 113a may be performed by using different dielectric compositions for forming the first and second regions of the side margin portions, in a process of manufacturing a multilayer ceramic capacitor 100.

For example, in the dielectric compositions for forming the first and second side margin portions, the content of magnesium (Mg) included in the dielectric composition for forming the second region may be increased to adjust the content of magnesium (Mg) included in the second regions 112b and 113b to be higher than the content of magnesium (Mg) included in the first regions 112a and 113a.

Therefore, the compactness of the second regions 112b and 113b of the margin portions 112 and 113 may be enhanced to improve the moisture resistance, may alleviate the electric field concentrated in internal electrode ends, and may prevent breakdown of insulation, which may be one of the major defects of the multilayer ceramic capacitor, to improve the reliability of the multilayer ceramic capacitor.

According to an embodiment of the present disclosure, the content of magnesium (Mg) included in the second regions 112b and 113b may be 10 mol or more and 30 mol or less, based on 100 mol of titanium (Ti) included in the second regions 112b and 113b of the first and second side margin portions.

The content of magnesium (Mg) included in the second regions 112b and 113b may be controlled to be 10 mol or more and 30 mol or less, based on 100 mol of titanium (Ti) included in the second regions 112b and 113b of the first and second side margin portions, to increase breakdown voltage (BDV), and to improve the moisture resistance.

When the content of magnesium (Mg) included in the second regions 112b and 113b is less than 10 mol, based on 100 mol of titanium (Ti) included in the second regions 112b and 113b of the first and second side margin portions, formation of the oxide layer in the pores generated at the interface in which the ceramic body and the side margin portion are in contact with each other may be not sufficient, to increase breakdown voltage (BDV), and to increase the short failure.

When the content of magnesium (Mg) included in the second regions 112b and 113b exceeds 30 mol, based on 100 mol of titanium (Ti) included in the second regions 112b and 113b of the first and second side margin portions, the sintering characteristic may be deteriorated to cause problems of deteriorating the reliability.

According to an embodiment of the present disclosure, a very small multilayer ceramic capacitor may be characterized in that a thickness of the dielectric layer 111 is 0.4 µm or less, and a thickness of each of the internal electrodes 121 and 122 may be 0.4 µm or less.

As in an embodiment of the present disclosure, when a thin film in which a thickness of the dielectric layer 111 is 0.4 µm or less and a thickness of each of the internal electrodes 121 and 122 is 0.4 µm or less is applied, the reliability of the device may be substantially affected by pores generated at the interface in which the ceramic body and the side margin portions are in contact with each other.

For example, in the case of the conventional multilayer ceramic capacitor, there may be no great problem in reliability even when the size of the dielectric grain of each of the side margin portions included in the multilayer ceramic capacitor according to an embodiment of the present disclosure is not adjusted.

In a product to which the dielectric layers and the internal electrodes of the thin film are applied, as in an embodiment of the present disclosure, the size of the dielectric grains included in the regions of each of the side margin portions should be controlled, to prevent the BDV and the reliability from being lowered due to the pores generated at an interface in which the ceramic body and the side margin portions are in contact with each other.

For example, in an embodiment of the present disclosure, the size (d2) of the dielectric grains included in the second regions 112b and 113b of the side margin portions adjacent to the internal electrodes 121 and 122 exposed from the first surface 1 and the second surface 2 of the ceramic body 110, may be adjusted to be larger than the size (d1) of the dielectric grains included in the first regions 112a and 113a adjacent to the outer side surfaces of the first and second side margin portions 112 and 113, to reduce the number or density of pores existing in the second regions 112b and 113b of the side margin portions adjacent to the side margin portions 121 and 122 (e.g., such that the second regions 112b and 113b have fewer pores or lower density of pores than the first regions 112a and 113a), and to improve the reliability for moisture resistance, in a case of a thin film in which the thickness of the dielectric layer 111 and the first and second internal electrodes 121 and 122 are 0.4 µm or less.

In this case, it can be understood as a concept that the thin film is not limited to only devices in which the thickness of the dielectric layer 111 and the first and second internal electrodes 121 and 122 are 0.4 µm or less, but more generally includes devices in which the dielectric layer and the internal electrodes are thinner than the conventional product.

A thickness (t1a) of the first regions 112a and 113a may be 12 µm or less, and a thickness (t1b) of the second regions 112b and 113b may be 3 µm or less, but are not limited thereto. Moreover, the thickness (t1b) of the second regions 112b and 113b may be 20% or less of the total thickness (t1=t1a+t1b) of the first and second side margin portions 112 and 113.

Referring to FIG. 4, a ratio of a thickness (t2) of a region of the first or second side margin portion contacting an end of an internal electrode disposed at an outermost periphery (e.g., an uppermost or lowermost internal electrode), relative to a thickness (t1) of a region of the first or second side margin portion contacting an end of an internal electrode disposed in a central portion, among the plurality of internal electrodes 121 and 122, may be 1.0 or less.

A lower limit of the ratio of the thickness (t2) of the region of the first or second side margin portion contacting the end of an internal electrode disposed at the outermost periphery, relative to the thickness (t1) of the region of the first or second side margin portion contacting the end of an internal electrode disposed in the central portion is not particularly restricted, but is preferably 0.9 or more.

According to an embodiment of the present disclosure, since the first or second side margin portion may be formed by attaching a ceramic green sheet to the side surface of the ceramic body, unlike the conventional art, the thickness of the first side margin portion or the second side margin portion may be maintained to be constant, depending on a position.

For example, in the conventional art, since the side margin portion may be formed by applying or printing a ceramic slurry, the thickness of the side margin portion may vary greatly, depending on a position.

In particular, in the conventional case, a thickness of the first or second side margin region contacting an end of the internal electrode disposed in a central portion of the ceramic body may be formed to be thicker than a thickness of the other region in a peripheral portion near edges of the ceramic body.

For example, in the conventional case, a ratio of a thickness of a region of the first or second side margin portion contacting an end of an internal electrode disposed at an outermost periphery, relative to a thickness of a region of the first or second side margin portion contacting an end of an internal electrode disposed in a central portion may be less than 0.9, and may have a relatively wide deviation.

In the conventional case in which the side marginal portion has such a relatively wide thickness deviation (e.g., less than 0.9), the side margin portion may need to be thick is order to ensure that the minimum thickness thereof has sufficient thickness. Hence, a portion occupied by the side margin portion may be relatively large in a multilayer ceramic capacitor having the same size, and accordingly a size of a capacitance forming portion may not be secured sufficiently to ensure a relatively high-capacitance.

In an embodiment of the present disclosure, since an average thickness of the first and second side margin portions 112 and 113 may be 2 µm or more and 10 µm or less, and the ratio of the thickness (t2) of the region of the first or second side margin portion contacting the end of an internal electrode disposed at the outermost periphery, relative to the thickness (t1) of the region of the first or second side margin portion contacting the end of an internal electrode disposed in the central portion, among the plurality of internal electrodes 121 and 122, may be 0.9 or more and 1.0 or less, a thickness of the side margin portion may be relatively thin, and deviation in thickness may be relatively small, to secure a relatively large size of the capacitance forming portion.

As a result, a high-capacitance multilayer ceramic capacitor may be realized.

Referring to FIG. 4, a ratio of a thickness (t3) of a region of the first or second side margin portion contacting an edge of the ceramic body 110, relative to the thickness (t1) of the region of the first or second side margin portion contacting the end of the internal electrode disposed in the central portion, among the plurality of internal electrodes 121 and 122, may be 1.0 or less.

A lower limit of the ratio of the thickness (t3) of the region of the first or second side margin portion contacting the edge of the ceramic body 110, relative to the thickness (t1) of the region of the first or second side margin portion contacting the end of an internal electrode disposed in the central portion is preferably 0.9 or more.

Because of this feature, the thickness deviation of the side margin portion may be relatively small in each region, to secure a relatively large size of the capacitance forming portion. Therefore, a high-capacitance multilayer ceramic capacitor may be realized.

Figure 6:
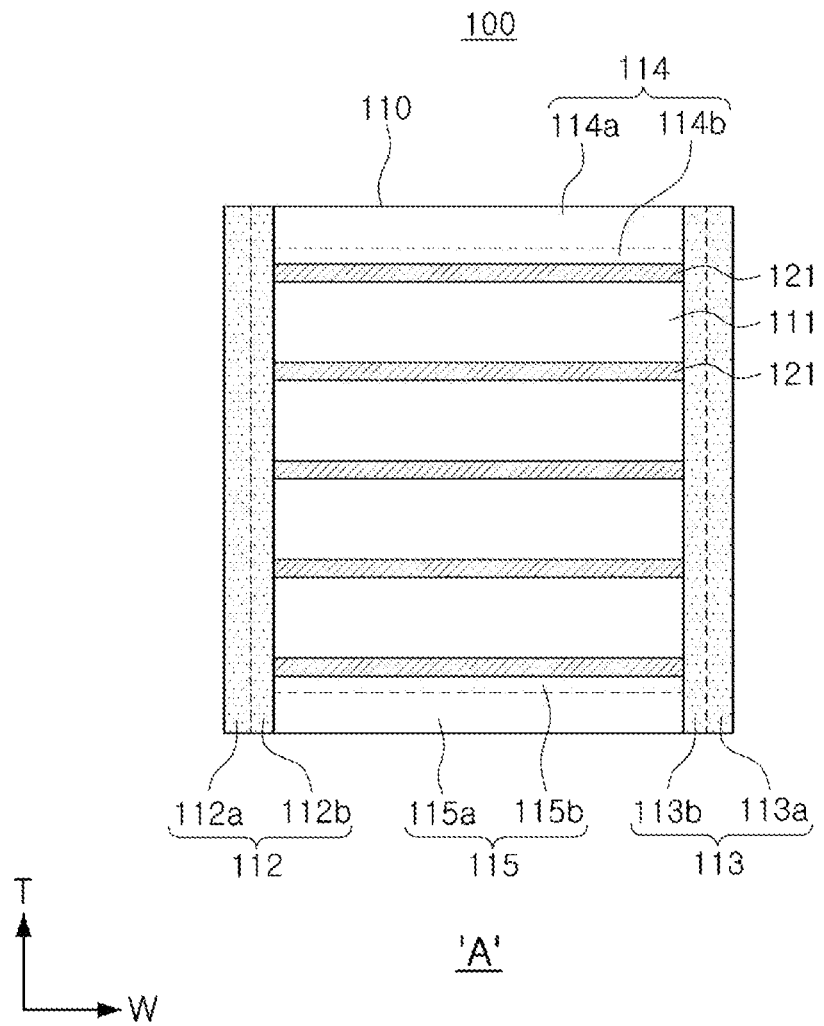
FIG. 6 is a side view of FIG. 2 according to another embodiment of the present disclosure, when viewed in direction A.

FIG. 6 is a side view of FIG. 2 according to another embodiment of the present disclosure, when viewed in direction A.

Referring to FIG. 6, in a multilayer ceramic electronic device according to the other embodiment of the present disclosure, cover portions 114 and 115 may be divided into first regions 114a and 115a adjacent to the fifth surface 5 and the sixth surface 6 of the ceramic body 110 (e.g., external surfaces of the ceramic body 110), and second regions 114b and 115b adjacent to the internal electrodes 121 and 122. In this case, a size of a dielectric grain included in the second regions 114b and 115b may be larger than a size of a dielectric grain included in the first regions 114a and 115a.

The cover portions 114 and 115 may include an upper cover portion 114 and a lower cover portion 115 formed on upper and lower surfaces of the active portion, respectively.

The upper cover portion 114 and the lower cover portion 115 may be respectively divided into the first regions 114a and 115a adjacent to the fifth surface 5 and the sixth surface 6 of the ceramic body 110, and the second regions 114b and 115b adjacent to the active portion including the first and second internal electrodes 121 and 122.

The upper cover portion 114 and the lower cover portion 115 may be divided into two regions having different sizes of dielectric grain. A size of the dielectric grains included in the second regions 114b and 115b may be adjusted to be larger than a size of the dielectric grains included in the first regions 114a and 115a, to improve the reliability for moisture resistance.

In particular, the size of the dielectric grains included in the second regions 114b and 115b adjacent to the internal electrodes 121 and 122 may be adjusted to be larger than the size of the dielectric grains included in the first regions 114a and 115a adjacent to the fifth surface 5 and the sixth surface 6 of the ceramic body 110, to reduce the number or density of pores existing in the second regions 114b and 115b adjacent to the internal electrodes 121 and 122, and to improve the reliability for moisture resistance.

A method of adjusting the size of the dielectric grains included in the second regions 114b and 115b adjacent to the internal electrodes 121 and 122 to be larger than the size of the dielectric grains included in the first regions 114a and 115a adjacent to the fifth surface 5 and the sixth surface 6 of the ceramic body 110, is not particularly limited. For example, the method may be realized by adjusting a size of raw ceramic powder particles to be introduced in an operation of forming the first regions 114a and 115a and the second regions 114b and 115b.

For example, the method may be realized by adjusting a particle size of barium titanate ($BaTiO_3$) powder particles used as a raw material for forming the second regions 114b and 115b adjacent to the internal electrodes 121 and 122 to be larger than a particle size of barium titanate ($BaTiO_3$) powder particles used as a raw material for forming the first regions 114a and 115a adjacent to the fifth surface 5 and the sixth surface 6 of the ceramic body 110.

Although not particularly limited, for example, the particle size of barium titanate ($BaTiO_3$) powder particles used as a raw material for forming the second regions 114b and 115b adjacent to the internal electrodes 121 and 122 may be about 70 nm, and the particle size of barium titanate ($BaTiO_3$) powder particles used as a raw material for forming the first regions 114a and 115a adjacent to the fifth surface 5 and the sixth surface 6 of the ceramic body 110 may be about 40 nm.

According to an embodiment of the present disclosure, a size of the raw ceramic powder particles to be introduced in the operations of forming the first regions 114a and 115a and the second regions 114b and 115b may be controlled. Therefore, after the sintering operation, the size of the dielectric grains included in the first regions 114a and 115a may be 90 nm or more and 410 nm or less, and the size of the dielectric grains included in the second regions 114b and 115b may be 170 nm or more and 700 nm or less.

The size of the dielectric grains may be measured in the same manner as the method for measuring the size of the dielectric grains included in the side margin portion, as described above.

In the upper and lower cover portions 114 and 115, the content of magnesium (Mg) included in the second regions 114b and 115b may be higher than the content of magnesium (Mg) included in the first regions 114a and 115a.

The upper and lower cover portions 114 and 115 of the ceramic body 110 may be divided into two regions having different compositions, and a magnesium (Mg) content included in the regions may be different from each other, to improve the compactness of the upper and lower cover portions 114 and 115, and improve the moisture resistance.

The content of magnesium (Mg) of the second regions 114b and 115b of the upper and lower cover portions 114 and 115 may be greater than the content of magnesium (Mg) of the first regions 114a and 115a of the upper and lower cover portions 114 and 115. Therefore, the compactness of the second regions 114b and 115b of the upper and lower cover portions 114 and 115 may be enhanced to improve the moisture resistance.

The content of magnesium (Mg) in the second regions 114b and 115b of the upper and lower cover portions 114 and 115 may be 10 mol or more and 30 mol or less, based on 100 mol of titanium (Ti) included in the second regions 114b and 115b of the upper and lower cover portions 114 and 115.

The content of magnesium (Mg) included in the second regions 114b and 115b of the upper and lower cover portions 114 and 115 may be controlled to be 10 mol or more and 30 mol or less, based on 100 mol of titanium (Ti) included in the second regions 114b and 115b of the upper and lower cover portions 114 and 115, to improve the moisture resistance.

FIGS. 7A to 7G are cross-sectional and perspective views schematically illustrating steps of a method of manufacturing a multilayer ceramic capacitor according to another embodiment of the present disclosure.

According to another embodiment of the present disclosure, a method of manufacturing a multilayer ceramic capacitor, includes: preparing a plurality of first ceramic green sheets each having a plurality of first internal electrode patterns formed at predetermined intervals, and a plurality of second ceramic green sheets each having a plurality of second internal electrode patterns formed at predetermined intervals; forming a ceramic green sheet stacked body by alternately stacking the first ceramic green sheets and the second ceramic green sheets to overlap the first internal electrode patterns and the second internal electrode patterns; cutting the ceramic green sheet stacked body to have ends of the first internal electrode patterns and ends of the second internal electrode patterns exposed to side surfaces in a width direction; forming a first side margin portion and a second side margin portion on the exposed ends of the first internal electrode patterns and the second internal electrode patterns, to provide a cut stacked body; and sintering the cut stacked body to provide a ceramic body comprising dielectric layers and first and second internal electrodes, wherein the first and second side margin portions each include a first region adjacent to an outer side surface of each of the side margin portions, and a second region adjacent to the exposed ends of the internal electrodes, and wherein an average size of dielectric grains included in the second region is larger than an average size of dielectric grains included in the first region.

Hereinafter, a method of manufacturing a multilayer ceramic capacitor according to another embodiment of the present disclosure will be described.

Figure 7A:
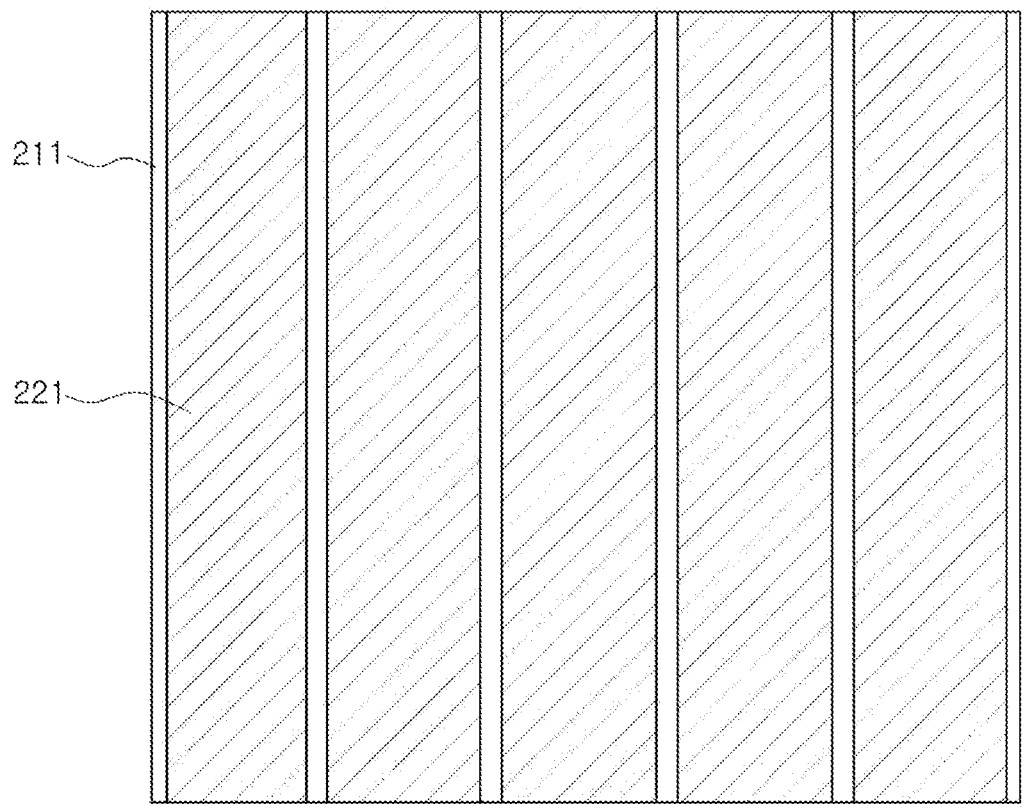
FIGS. 7A to 7G are cross-sectional and perspective views schematically illustrating steps of a method of manufacturing a multilayer ceramic capacitor according to another embodiment of the present disclosure.

As illustrated in FIG. 7A, a plurality of stripe-shaped first internal electrode patterns 221 may be formed on a ceramic green sheet 211 at predetermined intervals. The plurality of stripe-type first internal electrode patterns 221 may be formed in parallel with each other. In general, a plurality of such ceramic green sheet 211 having first internal electrode patterns 221 may be formed.

The ceramic green sheet 211 may be formed of a ceramic paste including a ceramic powder particle, an organic solvent, and an organic binder.

The ceramic powder particle may be a material having a high dielectric constant, but is not limited thereto. Examples thereof may include a barium titanate ($BaTiO_3$)-based material, a lead composite perovskite-based material, a strontium titanate ($SrTiO_3$)-based material, or the like, and is preferably a barium titanate ($BaTiO_3$)-based powder particle may be used. When the ceramic green sheet 211 is sintered, a dielectric layer 111 constituting a ceramic body 110 may be formed.

The stripe-shaped first internal electrode pattern 221 may be formed by an internal electrode paste containing a conductive metal. The conductive metal may be nickel (Ni), copper (Cu), palladium (Pd), or alloys thereof, but is not limited thereto.

The method of forming the stripe-shaped first internal electrode patterns 221 on the ceramic green sheet 211 is not particularly limited, but may be formed by a printing method such as a screen printing method or a gravure printing method.

Also, although not illustrated, a plurality of stripe-shaped second internal electrode patterns 222 may similarly be formed on another ceramic green sheet 211 at predetermined intervals. In general, a plurality of such ceramic green sheet 211 having second internal electrode patterns 222 may be formed.

Hereinafter, a ceramic green sheet on which the first internal electrode patterns 221 are formed may be referred to as a first ceramic green sheet, and a ceramic green sheet on which the second internal electrode patterns 222 are formed may be referred to as a second ceramic green sheet.

Figure 7B:
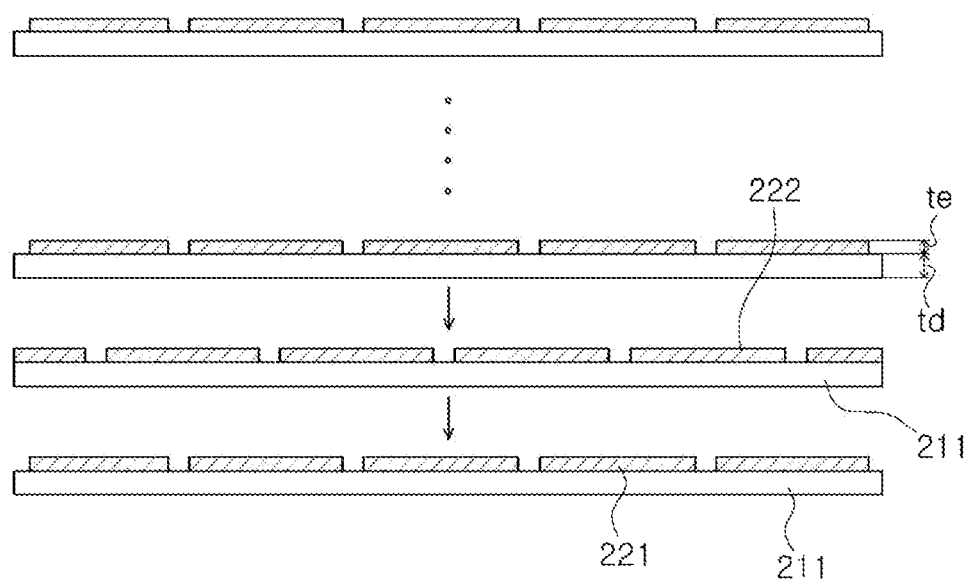

Next, as illustrated in FIG. 7B, pluralities of the first and second ceramic green sheets may be alternately stacked to alternately stack the stripe-shaped first internal electrode patterns 221 and the stripe-shaped second internal electrode patterns 222.

The stripe-shaped first internal electrode pattern 221 may become a first internal electrode 121, and the stripe-type second internal electrode pattern 222 may become a second internal electrode 122.

According to another embodiment of the present disclosure, a thickness (td) of each of the first and second ceramic green sheets may be 0.6 μm or less, and a thickness (te) of each of the first and second internal electrode patterns may be 0.5 μm or less.

Since the present disclosure may be used to form an ultra-small, high-capacitance multilayer ceramic capacitor having a dielectric layer having a thickness of 0.4 μm or less and a thickness of an internal electrode of 0.4 μm or less, the thickness (td) of each of the first and second ceramic green sheets may be 0.6 μm or less, and the thickness (te) of each of the first and second internal electrode patterns may be 0.5 μm or less.

Figure 7C:
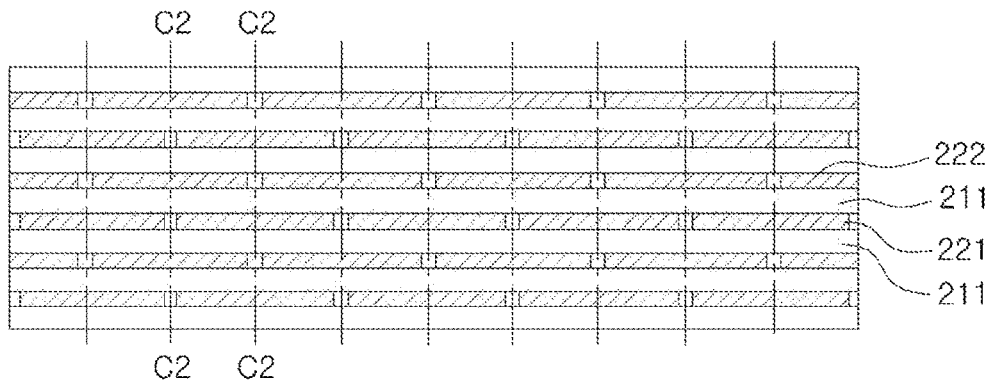
Figure 7D:
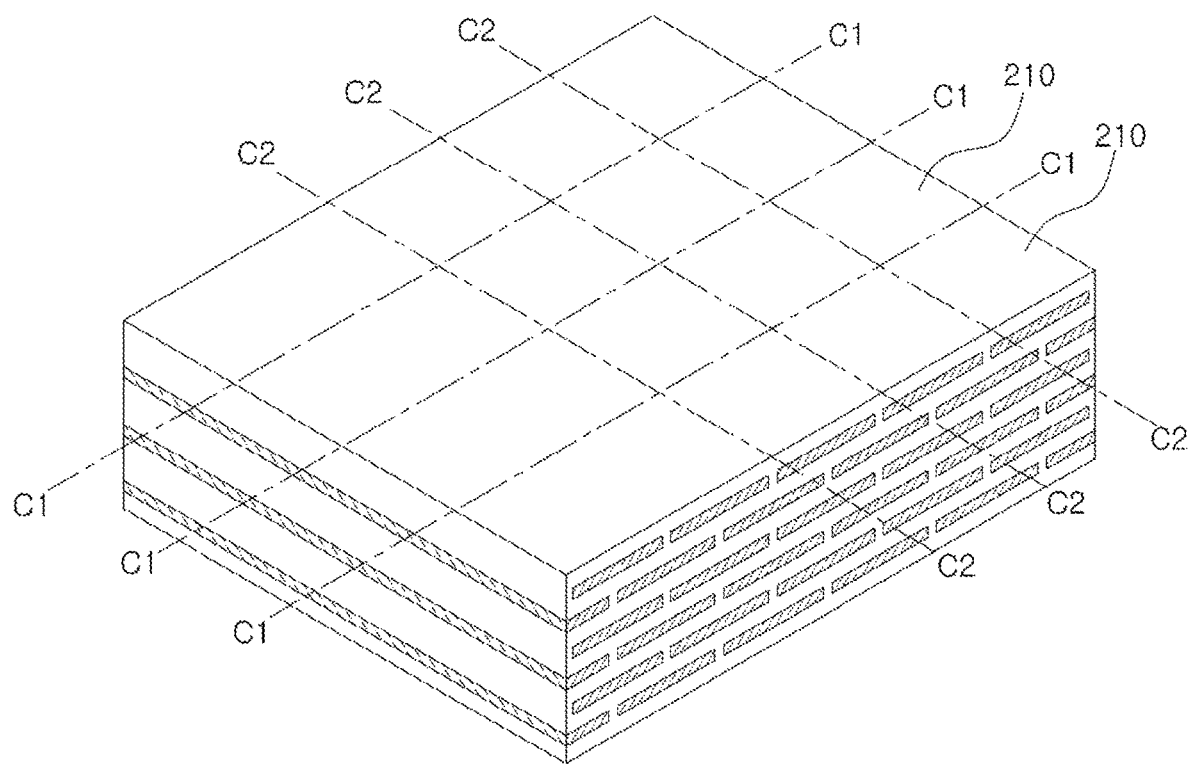

FIG. 7C is a cross-sectional view illustrating a ceramic green sheet stacked body 220 in which first and second ceramic green sheets are alternately stacked according to an embodiment of the present disclosure, and FIG. 7D is a perspective view illustrating the ceramic green sheet stacked body 220 in which first and second ceramic green sheets are alternately stacked.

Referring to FIGS. 7C and 7D, first ceramic green sheets on which a plurality of parallel stripe-type first internal electrode patterns 221 are printed and a second ceramic green sheets on which a plurality of parallel stripe-type second internal electrode patterns 222 are printed may be stacked alternately with each other.

In particular, they may be stacked to overlap a central portion of the stripe-shaped first internal electrode pattern 221 printed on the first ceramic green sheet and a space between the stripe-shaped second internal electrode patterns 222 printed on the second ceramic green sheet with each other, and to overlap a space between the stripe-shaped first internal electrode pattern 221 printed on the first ceramic green sheet and a central portion of the stripe-shaped second internal electrode patterns 222 printed on the second ceramic green sheet with each other.

Next, as illustrated in FIG. 7D, the ceramic green sheet stacked body 220 may be cut across the plurality of stripe-shaped first internal electrode patterns 221 and the plurality of the stripe-shaped second internal electrode patterns 222. For example, the ceramic green sheet stacked body 220 may be cut to form a plurality of stacked bodies 210 cut along cutting lines C1-C1 and C2-C2, orthogonal to each other.

In particular, the stripe-shaped first internal electrode patterns 221 and the stripe-shaped second internal electrode patterns 222 may be divided into a plurality of internal electrodes that are cut in a longitudinal direction and have a constant width. In this case, the stacked ceramic green sheets may be also cut together with the internal electrode patterns. Therefore, the dielectric layers may be formed to have the same width as a width of the internal electrodes.

It may also be cut in conformity with individual ceramic body sizes along cutting line C2-C2. For example, before forming the first side margin portion and the second side margin portion, the stacked body 210 may be formed in plural by cutting a rod-shaped stacked body into individual ceramic body sizes along cutting line C2-C2.

For example, the rod-shaped stacked body may be cut to be divided by cutting along lines having a predetermined interval and aligned with the central portion of the first internal electrodes and aligned with the central portion of the second internal electrodes. Therefore, one end of each of the first internal electrodes and one end of each of the second internal electrodes may be exposed along the cut surfaces on opposite end surfaces of the stacked bodies 210.

Thereafter, the first side margin portion and the second side margin portion may be respectively formed on the first and second side surfaces of the stacked body 210.

Figure 7E:
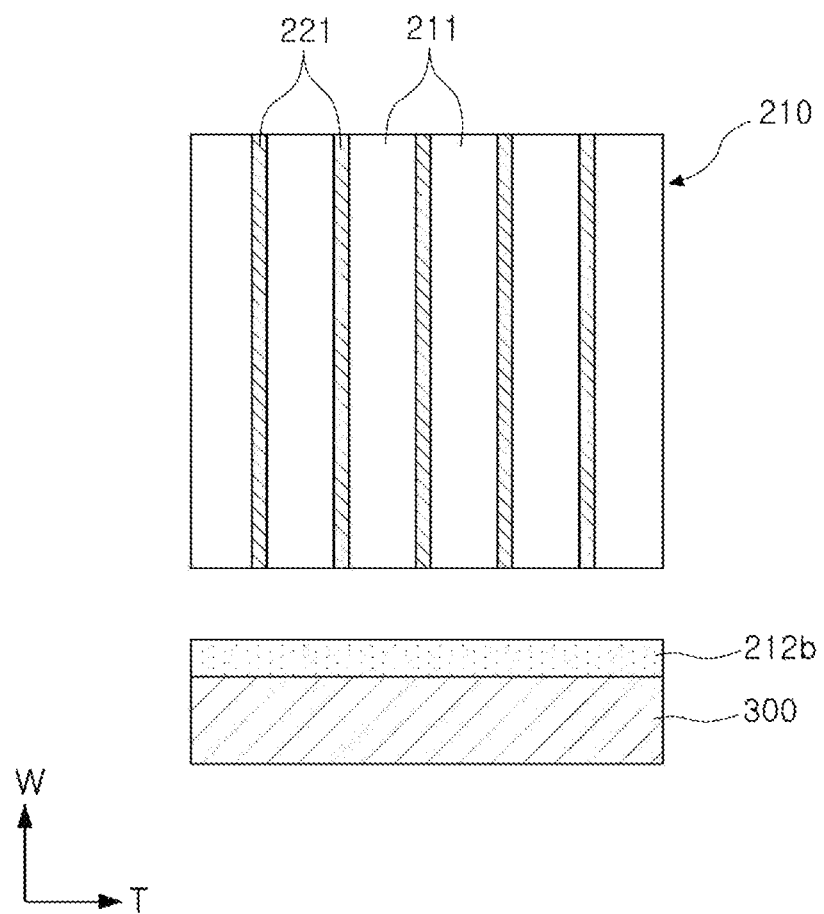

Next, as illustrated in FIG. 7E, a second region 212b of the first side margin portion may be formed on a first side surface of the stacked body 210.

In particular, in a method of forming the second region 212b of the first side margin portion, a ceramic green sheet for a side surface may be disposed on a punching elastic material 300 of a rubber material.

Next, the stacked body 210 may be rotated 90 degrees such that the first side surface of the stacked body 210 faces the ceramic green sheet for the side surface, and then the stacked body 210 may be pressed tightly against the ceramic green sheet for the side surface.

When the stacked body 210 is pressed against the ceramic green sheet for the side surface to transfer the ceramic green sheet for the side surface to the stacked body 210, due to the elasticity of the punching elastic material 300 formed of rubber material, the ceramic green sheet for the side surface may be formed up to a side edge portion of the stacked body 210, and the remaining portion may be cut.

Figure 7F:
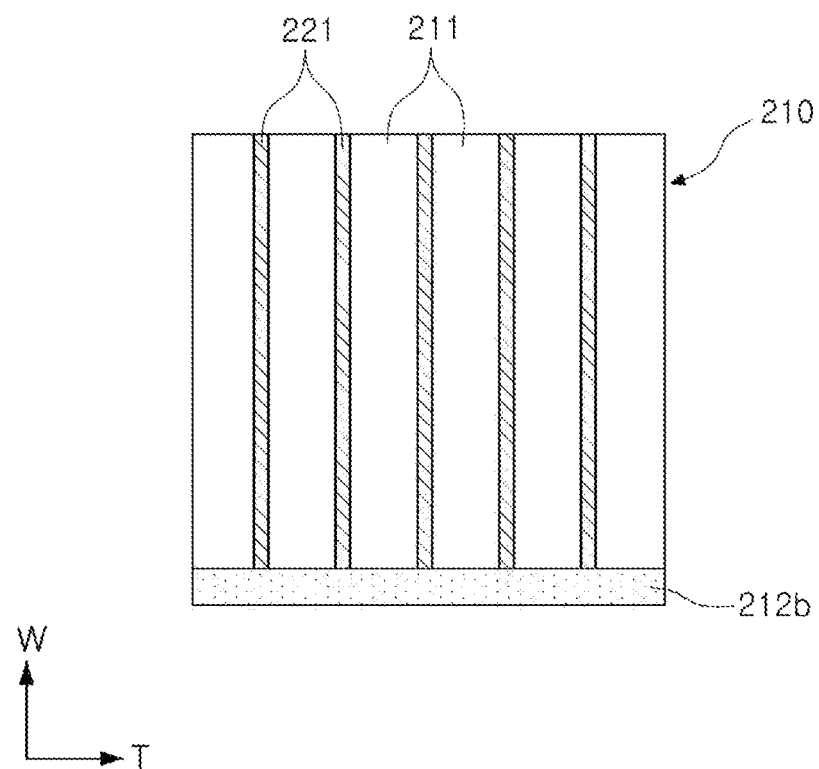

Therefore, as illustrated in FIG. 7F, the second region 212b of the first side margin portion may be formed on the first side surface of the stacked body 210.

Thereafter, the stacked body 210 may be rotated to form a second region of the second side margin portion on the second side surface of the stacked body 210.

Figure 7G:
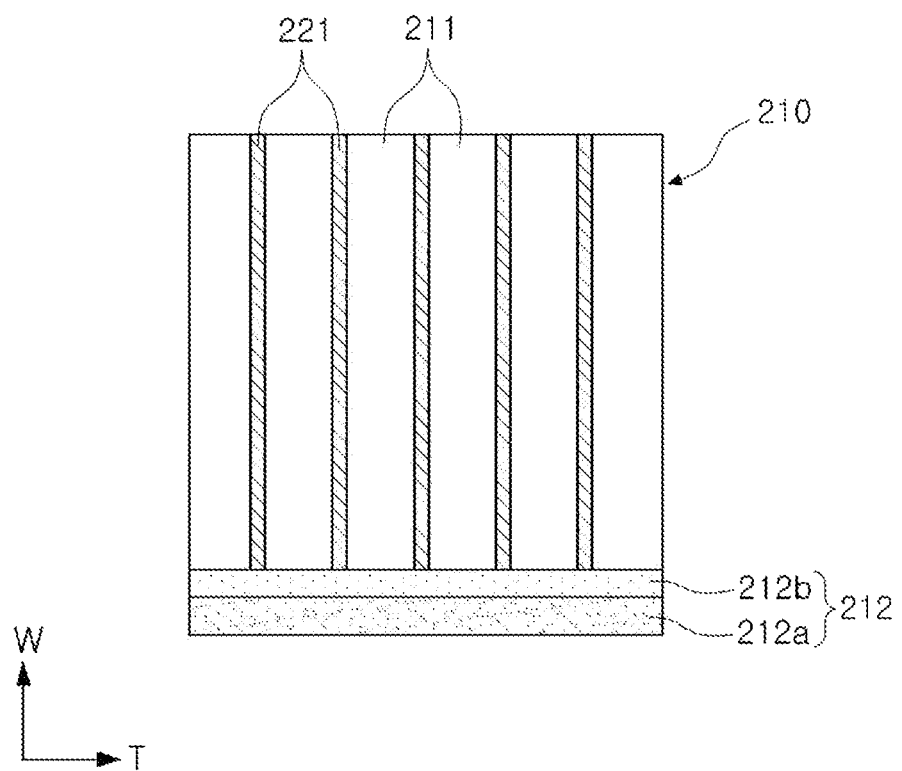

Next, as illustrated in FIG. 7G, a first region 212a of the first side margin portion may be formed on the first side surface of the stacked body 210.

A method of forming the first region 212a of the first side margin portion on the first side surface of the stacked body 210 may be identical to the method of forming the second region 212b of the first side margin portion on the first side surface of the stacked body 210, as described above.

Next, a stacked body having first and second side margin portions on both side surfaces of the stacked body 210 may be calcined and sintered, to form a ceramic body including the dielectric layers and the first and second internal electrodes.

Hereinafter, external electrodes may be respectively formed on the third side surface of the ceramic body from which the first internal electrodes are exposed and on the fourth side surface of the ceramic body from which the second internal electrodes are exposed.

According to another embodiment of the present disclosure, the ceramic green sheet for the side surface may be relatively thin, and deviation in thickness may be relatively small, to secure a relatively large size of the capacitance forming portion.

In particular, since the average thickness of the first and second side margin portions 112 and 113, after the sintering operation, may be 2 µm or more and 15 µm or less, the deviation in thickness of the first and second side margin portions 112 and 113 may be relatively small.

As a result, a high-capacitance multilayer ceramic capacitor may be realized.

The description of the same features as those of the above-described embodiment of the present disclosure will be omitted here to avoid redundancy.

Hereinafter, the present disclosure will be described in more detail with reference to Experimental Examples, such Experimental Examples may be to provide the specific understanding of the present disclosure, and the present disclosure is not limited by the Experimental Examples.

Experimental Examples

According to an embodiment of the present disclosure, Comparative Examples in which a conventional side margin portion was formed, and Inventive Examples, in which a side margin portion including first and second regions having different sizes of dielectric grains was formed, were provided.

A ceramic green sheet stacked body was formed by attaching a ceramic green sheet for aside surface, as in the above Comparative Examples, to an electrode exposed portion of a green chip from which internal electrodes were exposed in a width direction, respectively, to form a side margin portion.

A ceramic green sheet for a side surface was attached to both side surfaces of the ceramic green sheet stacked body, by applying a constant temperature and pressure thereto under a condition of minimizing deformation of the chip, to prepare a multilayer ceramic capacitor green chip having a size of 0603 (width×length×height: 0.6 mm×0.3 mm×0.3 mm).

The multilayer ceramic capacitor specimens thus prepared were subjected to a calcination treatment under a nitrogen atmosphere at a temperature of 400° C. or less, were sintered under the conditions of a sintering temperature of 1200° C. or less and a $H_2$ concentration of 0.5% or less, and were confirmed with respect to electric characteristics such as appearance defects, insulation resistance, moisture resistance, and the like.

Figure 8A:
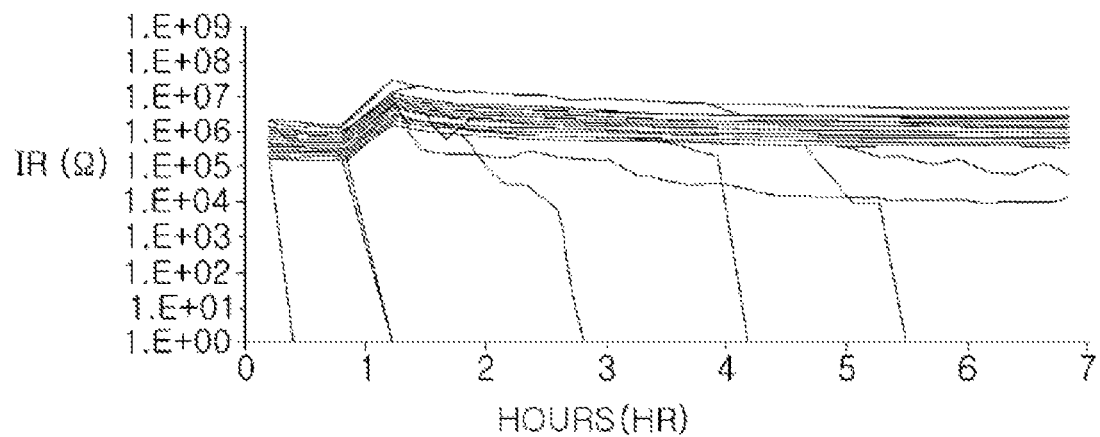
FIGS. 8A and 8B show a set of graphs comparing results of reliability tests for moisture resistance according to Inventive and Comparative Examples of the present disclosure.
Figure 8B:
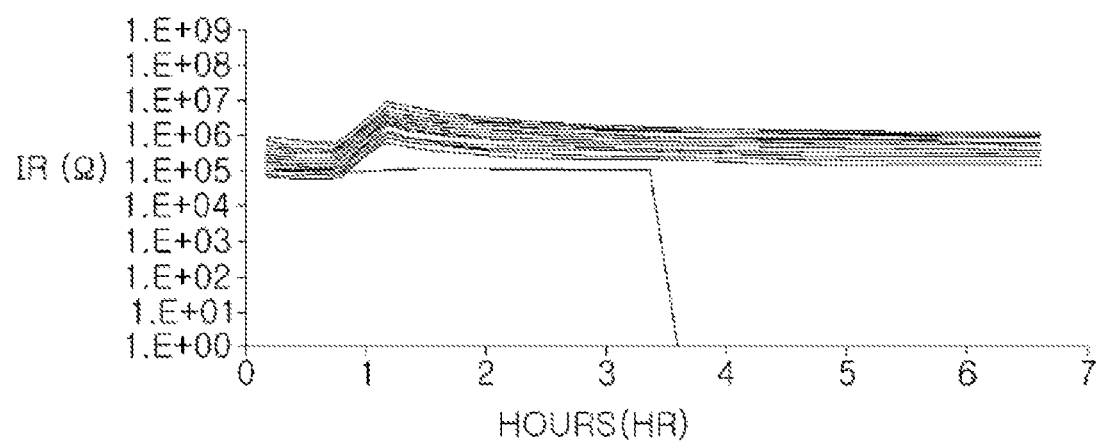

FIGS. 8A and 8B show graphs is a graph comparing results of reliability test for moisture resistance according to Inventive and Comparative Examples of the present disclosure.

FIG. 8A illustrates Comparative Examples using conventional multilayer ceramic capacitor structures, in which there were no difference in a size of dielectric grains included in different regions of a side margin portion, and FIG. 8B illustrates Inventive Examples in which, in the side margin portions 112 and 113, the size (d2) of the dielectric grains included in the second regions 112b and 113b was larger than the size (d1) of the dielectric grains included in the first regions 112a and 113a.

It can be seen that the Comparative Examples had a problem of the reliability in moisture resistance, and in Inventive Examples had excellent reliability in moisture resistance.

According to an embodiment of the present disclosure, the first and second side margin portions may be divided into the first region adjacent to the outer side surface of each of the side margin portions, and the second region adjacent to the internal electrodes exposed on the first and second surfaces of the ceramic body, wherein a size of dielectric grains included in the second region is larger than a size of dielectric grains included in the first region, thereby improving the reliability for moisture resistance.

In addition, since the size of the dielectric grains included in the first region may be controlled to be smaller than the size of the dielectric grains included in the second region, a high-toughness gap sheet may be formed, and a mounting crack may be improved.

Further, the content of magnesium (Mg) included in the region of the side margin portion adjacent to the side surface of the ceramic body in the width direction may be adjusted to improve the reliability in moisture resistance.

The cover portion may be divided into the first region adjacent to the external surface of the ceramic body and the second region adjacent to the uppermost or lowermost internal electrode among the plurality of internal electrodes, and the size of the dielectric grains and the content of magnesium (Mg) included in the first region and the second region may be adjusted to improve the reliability in moisture resistance.

While example embodiments have been illustrated and described above, it will be apparent to those skilled in the art that modifications and deviations could be made without departing from the scope of the present disclosure as defined by the appended claims.

What is claimed is:

1. A multilayer ceramic capacitor comprising:
a ceramic body including dielectric layers, and including a first surface and a second surface opposing each other, a third surface and a fourth surface connecting the first and second surfaces and opposing each other, and a fifth surface and a sixth surface connected to the first, second, third, and fourth surfaces and opposing each other;
a plurality of internal electrodes disposed in the ceramic body, extending to the first and second surfaces, and extending to only one of the third surface or the fourth surface; and
a first side margin portion and a second side margin portion respectively arranged on end portions of the internal electrodes extending to the first and second surfaces,
wherein the ceramic body comprises an active portion comprising the plurality of internal electrodes arranged to face each other with the dielectric layers interposed therebetween to form capacitance, and cover portions disposed above an uppermost internal electrode and below a lowermost internal electrode in the ceramic body,
the cover portions each include a first region adjacent to the fifth and sixth surfaces of the ceramic body, and a second region adjacent to the uppermost or lowermost internal electrode, wherein an average size of dielectric grains included in the second region of each of the cover portions is larger than an average size of dielectric grains included in the first region of each of the cover portions, and
wherein a content of magnesium (Mg) included in the second region of each of the cover portions is different from a content of magnesium (Mg) included in the first region of each of the cover portions.

2. The multilayer ceramic capacitor according to claim 1, wherein a content of magnesium (Mg) included in the second region is greater than a content of magnesium (Mg) included in the first region.

3. The multilayer ceramic capacitor of claim 1, wherein the content of magnesium (Mg) included in the second region is 10 mol or more and 30 mol or less, based on 100 mol of titanium (Ti) included in the second region.

4. The multilayer ceramic capacitor according to claim 1, wherein sizes of dielectric grains included in the first region are 90 nm or more and 410 nm or less.

5. The multilayer ceramic capacitor according to claim 1, wherein sizes of dielectric grains included in the second region are 170 nm or more and 700 nm or less.

6. The multilayer ceramic capacitor according to claim 1, wherein the cover portions each have a thickness of 20 μm or less.

7. The multilayer ceramic capacitor according to claim 1, wherein a thickness of one of the dielectric layers is 0.4 μm or less.

8. The multilayer ceramic capacitor according to claim 1, wherein a thickness of one of the internal electrodes is 0.4 μm or less.

* * * * *